(12) United States Patent
Kogure et al.

(10) Patent No.: US 7,312,907 B2
(45) Date of Patent: Dec. 25, 2007

(54) HOLOGRAM APPARATUS AND HOLOGRAM RECORDING AND PLAYBACK METHOD

(75) Inventors: Kazuya Kogure, Gunma (JP); Aaron Wegner, Longmont, CO (US)

(73) Assignee: Sanyo Electric Co., Ltd., Osaka (JP)

( * ) Notice: Subject to any disclaimer, the term of this patent is extended or adjusted under 35 U.S.C. 154(b) by 141 days.

(21) Appl. No.: 11/204,400

(22) Filed: Aug. 16, 2005

(65) Prior Publication Data

US 2007/0019267 A1 Jan. 25, 2007

(30) Foreign Application Priority Data

Jul. 19, 2005 (JP) ............................. 2005-209255

(51) Int. Cl.
 *G03H 1/30* (2006.01)
(52) U.S. Cl. ........................................ 359/25; 359/900
(58) Field of Classification Search .................... 359/1, 359/22, 24, 25, 32, 35, 900
 See application file for complete search history.

(56) References Cited

U.S. PATENT DOCUMENTS 5,777,760 A * 7/1998 Hays et al. ..................... 359/7

7,116,626 B1 * 10/2006 Woods et al. ................ 369/103

FOREIGN PATENT DOCUMENTS

JP 2004-177958 6/2004

* cited by examiner

*Primary Examiner*—Alessandro Amari
(74) *Attorney, Agent, or Firm*—Fish & Richardson P.C.

(57) ABSTRACT

A hologram recording and playback method comprises establishing in advance a test region adapted to record a piece of test data for each of a reference incidence angle and a plurality of stepped incidence angles of a recording reference beam in a recording medium, successively setting an incidence angle of the recording reference beam equal to the reference incidence angle or one of the plurality of the stepped incidence angles, successively recording in the test region each piece of the test data, causing a playback reference beam to be applied to the test region at the same incidence angle as the reference incidence angle to globally play back all the pieces of the test data, selecting the data with the maximum diffraction efficiency, and correcting the incidence angles of the recording reference beam and the playback reference beam based on the difference between the reference incidence angle or one of the plurality of the stepped incidence angles corresponding to the selected data and the reference incidence angle.

20 Claims, 10 Drawing Sheets

HOLOGRAM APPARATUS AND HOLOGRAM RECORDING AND PLAYBACK METHOD

CROSS-REFERENCE TO RELATED APPLICATIONS

The present application claims priority upon Japanese Patent Application No. 2005-209255 filed on Jul. 19, 2005, which is herein incorporated by reference.

BACKGROUND OF THE INVENTION

1. Field of the Invention

The present invention relates to a hologram apparatus and a hologram recording and playback method.

2. Description of the Related Art

Among hologram recording media adapted to record digital data as a hologram is a medium that has a photosensitive resin (e.g., photopolymer) sealed between glass substrates. To record digital data on a hologram recording medium as a hologram, a coherent laser beam from the semiconductor laser device is first split into two laser beams with a PBS (Polarization Beam Splitter). Then, two laser beams, one (hereinafter referred to as "reference beam") and the other (hereinafter referred to as "data beam") reflecting the information of two-dimensional gray image pattern formed in an SLM (Spatial Light Modulator) obtained as a result of applying the other beam to the SLM having digital data formed as the two-dimensional gray image pattern, are applied to the hologram recording medium at a given angle. This causes the target digital data to be recorded in the hologram recording medium.

Figure 8:
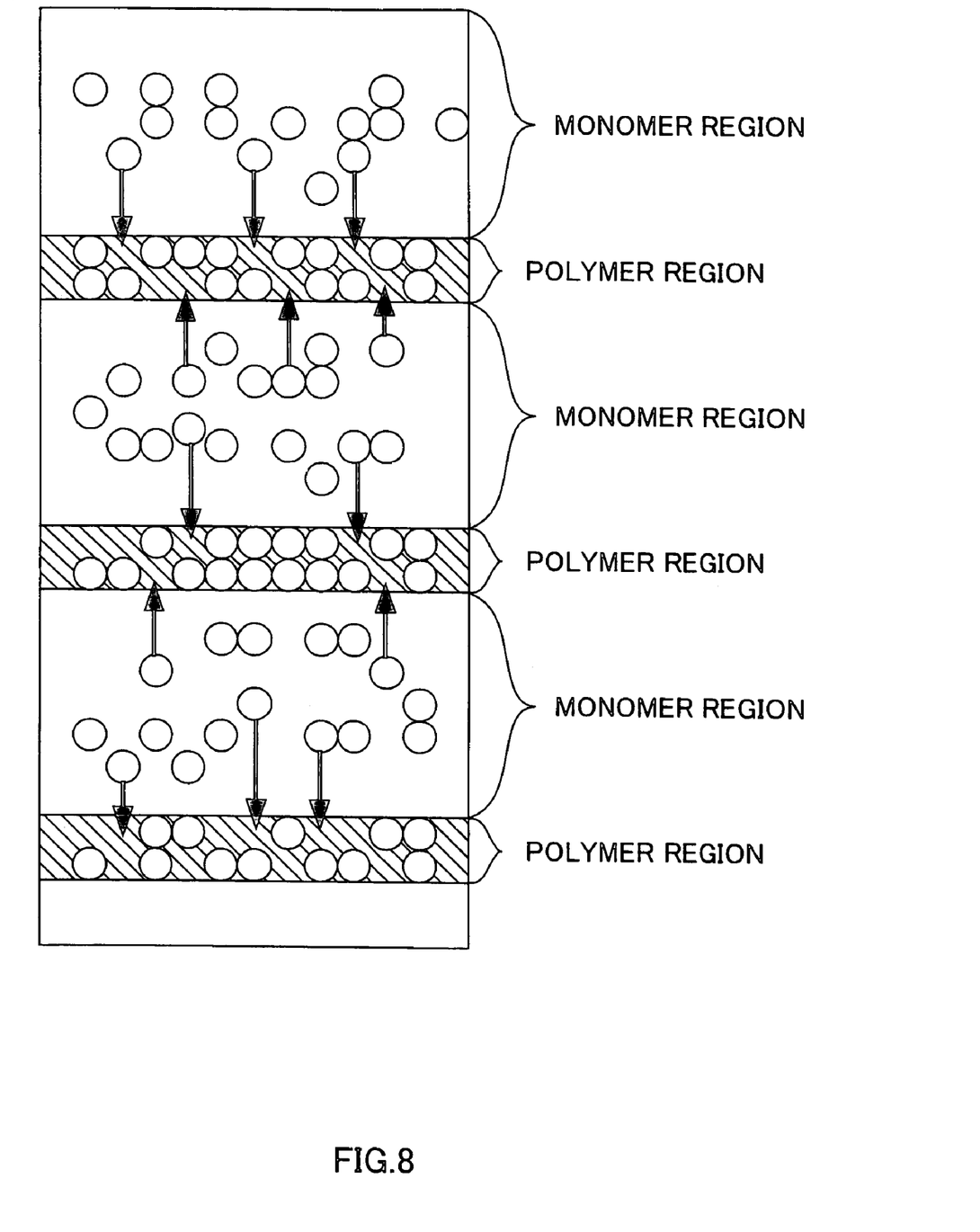
FIG. 8 schematically illustrates how monomers are transformed into polymers in a hologram recording medium.

More specifically, the photosensitive resin making up the hologram recording medium has a finite number of monomers. When the laser beam (hereinafter referred to as "laser beam") made up of the reference and data beams is irradiated thereinto, the monomers change into polymers correspondingly with the energy determined by the light intensity of the laser beam and the irradiation time. As a result of the transformation of the monomers into polymers, an interference fringe, made up of polymers, is formed correspondingly with the laser beam energy. Moreover, as a result of the formation of such an interference fringe in the hologram recording medium, digital data is recorded as a hologram. Later, remaining monomers migrate (spread) to those locations that have consumed monomers. Further, as a result of the irradiation of the laser beam, such monomers change into polymers. It is to be noted that FIG. 8 schematically illustrates how monomers transform into polymers correspondingly with the laser beam energy in the hologram recording medium.

Figure 9:
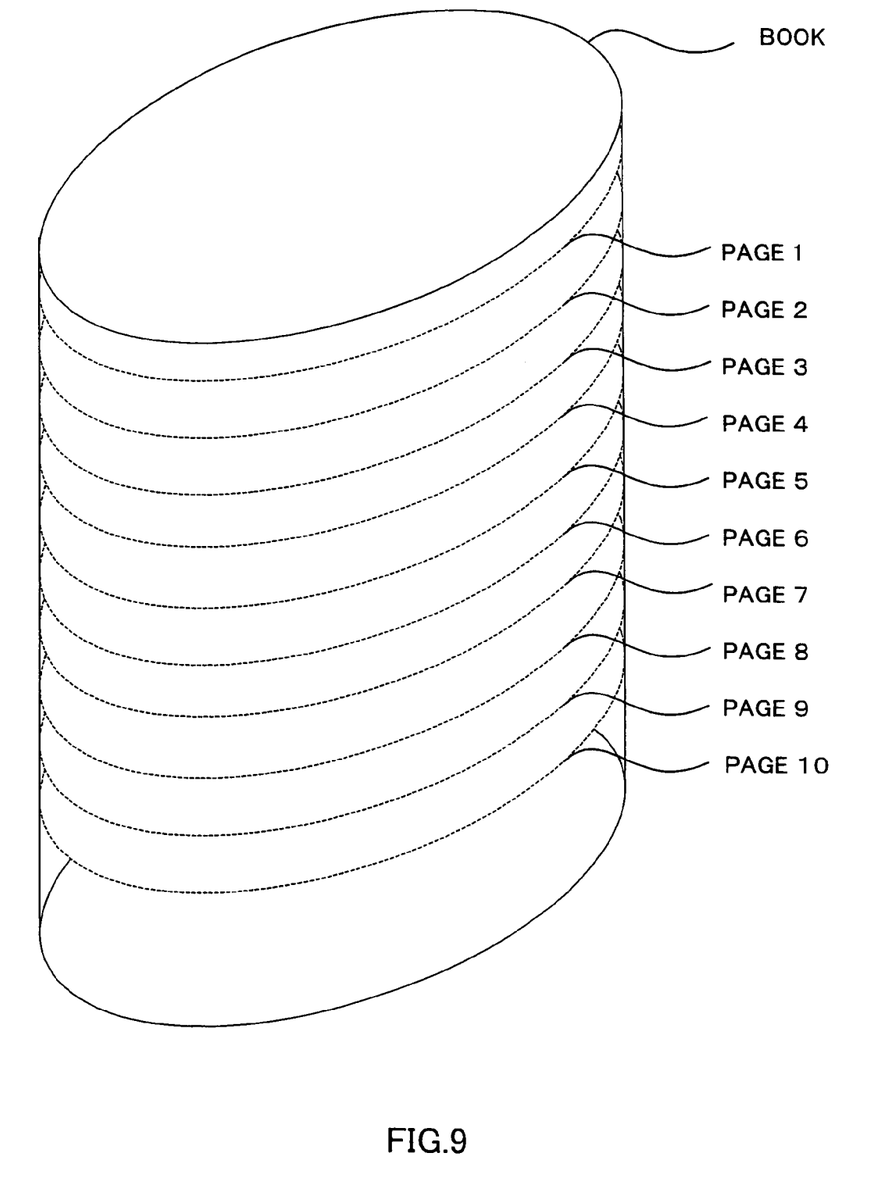
FIG. 9 is an explanatory view of the recording format of the hologram recording medium.

It is also to be noted that if a large amount of digital data must be recorded in the hologram recording medium, the incidence angle of the reference beam into the hologram recording medium is changed to enable the so-called "angle-multiplexed recording" adapted to form a number of holograms. For example, a hologram formed in the hologram recording medium is called a page, whereas a multiplexed hologram made up of a number of pages is called a book. FIG. 9 schematically illustrates the book and the pages in the angle-multiplexed recording. As shown in FIG. 9, the incidence angle of the reference beam is varied to form, for example, ten pages of holograms for a single book in the angle-multiplexed recording. Thus, the angle-multiplexed recording allows for the recording of a large amount of digital data.

To play back digital data from the hologram recording medium, on the other hand, the reference beam is irradiated onto the interference fringe representing the digital data at the same incidence angle as when the interference fringe was formed. The reference beam (hereinafter referred to as "playback beam") diffracted by the interference fringe is received by an image sensor or other means. The playback beam received by the image sensor or other means constitutes a two-dimensional gray image pattern representing the above-described digital data. Then, the digital data can be demodulated from this two-dimensional gray image pattern with a decoder or other means to play back the digital data.

It is to be noted that FIG. 1 in Japanese Patent Application Laid-open Publication No. 2004-177958, for example, discloses a hologram recording/playback apparatus operable to record holograms to and play them back from a hologram recording medium as described above.

Figure 10:
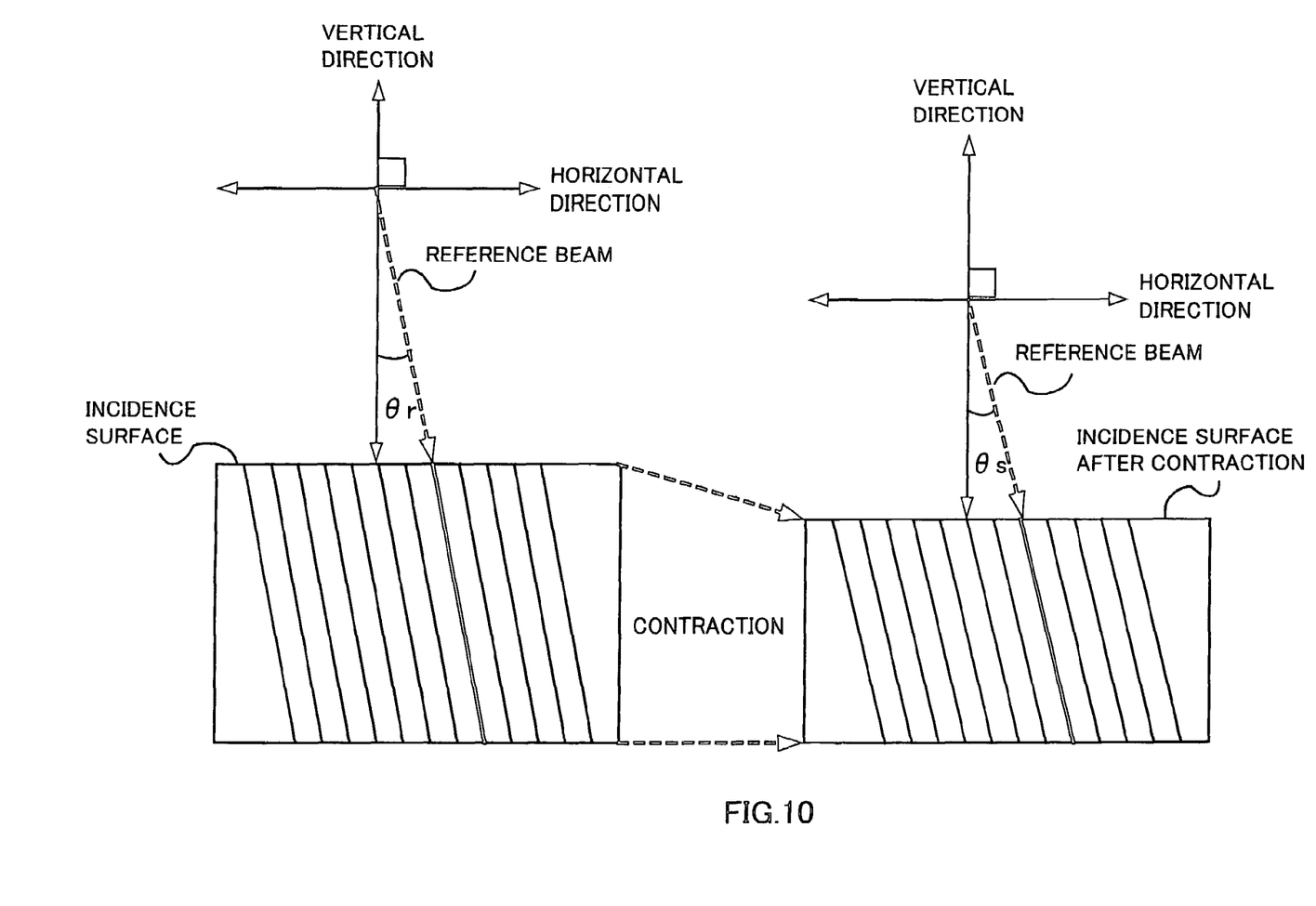
FIG. 10 is an explanatory view of a discrepancy in the reference beam incidence angle resulting from the contraction of the hologram recording medium.

Incidentally, a photosensitive resin, a resin that changes its molecular structure as it receives a laser beam, is primarily used as a hologram recording medium as described earlier. It is known that a hologram recording medium varies in volume due to this reaction that causes the photosensitive resin to change its molecular structure. Further, this volume change is known to vary depending on the characteristics of the hologram recording medium and the light intensity of the laser beam. For this reason, even if a laser beam is applied to a hologram (interference fringe) recorded in the hologram recording medium at the same incidence angle as during the hologram recording, the hologram may not be played back properly. FIG. 10 illustrates how a hologram recording medium contracts as an example of the volume change of the hologram recording medium.

In FIG. 10, the incidence surface refers to one of the surfaces of the hologram recording medium struck by the laser beam, whereas the vertical direction refers to the normal direction at an arbitrary point or the latitudinal direction of the hologram recording medium assuming that the incidence surface is a curved surface, and the horizontal direction refers to the direction vertical to the normal direction and the longitudinal direction of the hologram recording medium.

Here, the contraction of the hologram recording medium is dispersed in the horizontal direction. Therefore, the shape thereof will not undergo much change. In the vertical direction, on the other hand, the region of the medium is limited. This makes the dispersion of the contraction small. As a result, the shape change tends to be large. If such a contraction takes place, the disposition angle of the interference fringes changes although the spacing between interference fringes, recorded in the hologram recording medium, does not vary much. This change in the interference fringe disposition angle leads to a discrepancy between the incidence angle of the laser beam during the hologram recording and that during the hologram playback. It is to be noted that, in the example shown in FIG. 10, the laser beam is first applied to the hologram recording medium at the incidence angle of θr relative to the vertical direction before the contraction. After the contraction, on the other hand, the laser beam is applied to the hologram recording medium at the incidence angle of θs relative to the vertical direction. To play back the hologram after the contraction, therefore, the laser beam, corrected to the angle changed as a result of the contraction, must be applied to the hologram recording medium. For this reason, a method is proposed, that consists of searching for a proper laser beam incidence angle while at the same time changing the laser beam incidence angle onto the holograms recorded in the hologram recording medium to play back the holograms, as a simple and reliable method. However, this method requires several hologram playbacks before the proper laser beam incidence angle can be searched for. This makes the method unfit for the hologram playback that is also demanded to be faster.

SUMMARY OF THE INVENTION

The present invention, whose chief object is to solve the aforementioned problem, consists, in a hologram apparatus for causing a coherent data beam reflecting data to be recorded and a coherent recording reference beam after being reflected by a mirror adjustable in inclination angle to be applied to a hologram recording medium to record a hologram so as to form interference fringes and for playing back a hologram based on a diffracted light obtained as a result of applying a coherent playback reference beam after being reflected by the mirror to the hologram recording medium at the same incidence angle as the recording reference beam, a test region being established in advance in the hologram recording medium, the test region being adapted to record a piece of test data for each of the reference incidence angle and a plurality of stepped incidence angles of the recording reference beam, the hologram apparatus comprising a mirror controller that adjusts the inclination angle of the mirror; a system controller that successively adjusts the inclination angle of the mirror so as to set the incidence angle of the recording reference beam equal to the reference incidence angle or one of the plurality of the stepped incidence angles, successively records in the test region the piece of the test data corresponding to the reference incidence angle or one of the plurality of the stepped incidence angles that is successively set, and applies the playback reference beam to the test region at the same incidence angle as the recording reference beam to globally play back all the pieces of the test data that have been successively recorded; and a mirror inclination angle corrector that selects, among the test data that has been globally played back, the data with the maximum diffraction efficiency, and corrects the inclination angle of the mirror based on the difference between the reference incidence angle or one of the plurality of the stepped incidence angles corresponding to the selected data and the reference incidence angle.

The present invention can provide a hologram apparatus and hologram recording and playback method capable of properly avoiding defective conditions of the hologram recording and playback resulting from the volume change of the hologram recording medium.

DETAILED DESCRIPTION OF THE INVENTION

<Overall Configuration of the Hologram Apparatus>

Figure 1:
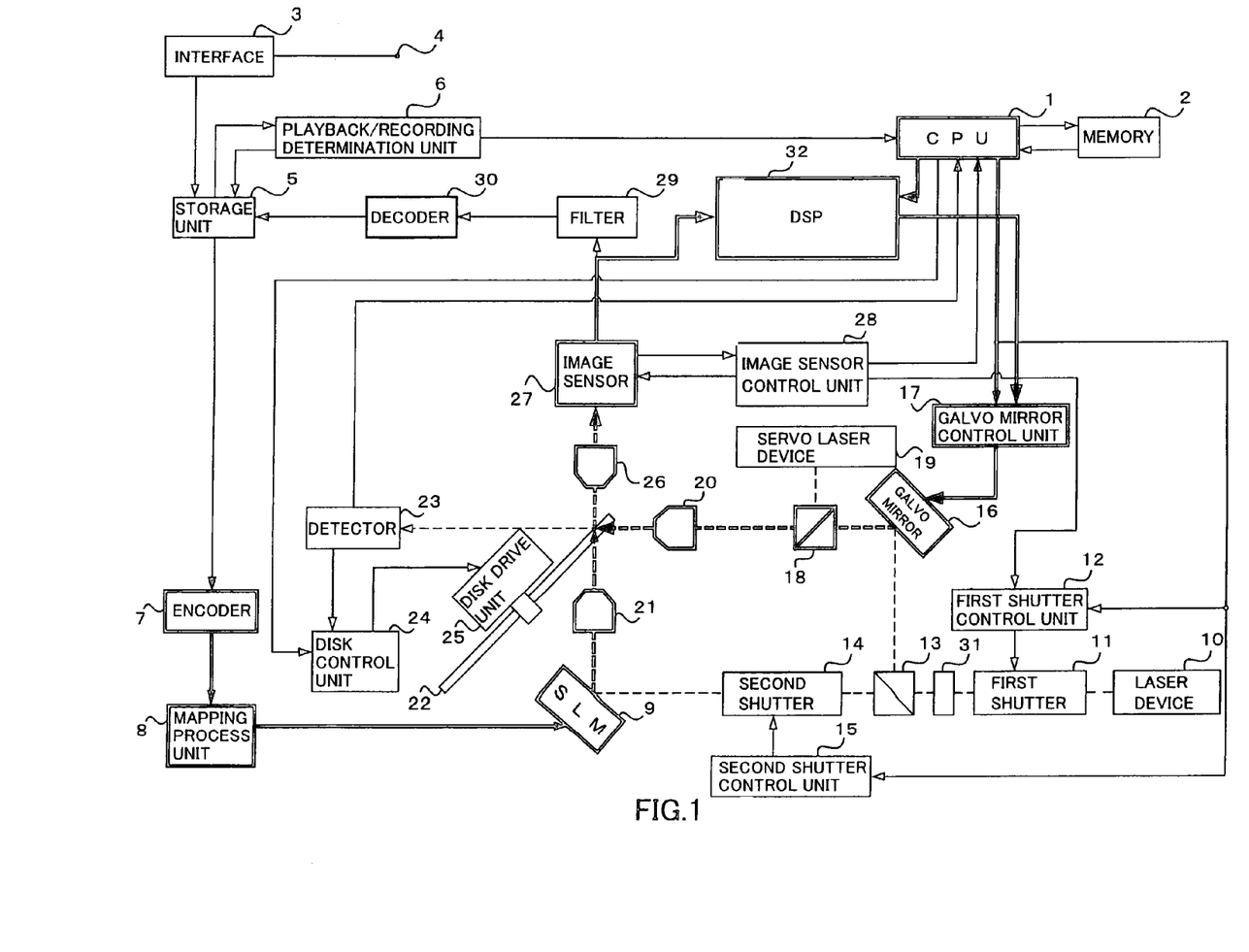
FIG. 1 illustrates the configuration of a hologram apparatus according to an embodiment of the present invention.

Description will be given of the configuration of a hologram apparatus according to an embodiment of the present invention based on FIG. 1.

The hologram apparatus has a CPU 1, a memory 2, an interface 3, a connection terminal 4, a buffer 5, a playback/recording determination unit 6, an encoder 7, a mapping process unit 8, an SLM 9, a laser device 10, a first shutter 11, a first shutter control unit 12, a PBS 13, a second shutter 14, a second shutter control unit 15, a galvo mirror 16, a galvo mirror control unit 17, dichroic mirror 18, a servo laser device 19, a scanner lens 20, Fourier transform lenses 21 and 26, a detector 23, a disk control unit 24, a disk drive unit 25, an image sensor 27, an image sensor control unit 28, a filter 29, a decoder 30, a ½ wavelength plate 31 and a DSP 31.

The interface 3 handles data exchange between host equipment (e.g., PC, workstation) connected via the connection terminal 4 and the hologram apparatus.

The buffer 5 stores playback instruction data from the host equipment adapted to play back the data stored in the hologram recording medium 22. The buffer 5 also stores recording instruction data adapted to store the bit string data from the host equipment in the hologram recording medium 22. The buffer 5 further stores the bit string data to be recorded in the hologram recording medium 22.

The playback/recording determination unit 6 determines at a specified timing whether a playback or recording instruction signal is recorded in the buffer 5. When determining that a playback instruction signal is recorded in the buffer 5, the playback/recording determination unit 6 sends an instruction signal to carry out the playback process in the hologram recording/playback apparatus to a CPU 1. When determining that a recording instruction signal is recorded in the buffer 5, on the other hand, the playback/recording determination unit 6 sends an instruction signal to carry out the recording process in the hologram recording/playback apparatus to the CPU 1 to cause the buffer 5 to send to an encoder 7 the data from the host equipment to be recorded in the hologram recording medium 22. Further, the playback/recording determination unit 6 sends data volume information on the volume of data to be recorded in the hologram recording medium 22 to the CPU 1.

The encoder 7 first stores the bit string data transferred from the buffer 5 in a memory (not shown) such as SRAM or DRAM that is accessible by the encoder 7. Then, the encoder 7 carries out the encoding process on the bit string data stored in the memory such as adding error correction code to the data and then supplies the data to the mapping process unit 8. Here, the unit bit string data subjected to the encoding process is called modulated code.

The mapping process unit 8 converts the modulated code supplied from the encoder 7 to modulated image data constituting the layout pattern of the code (e.g., 1280 bits down×1280 bits across≈1.6 Mbits). Then, the mapping process unit 8 supplies the modulated image data to the SLM 9.

The SLM 9 forms a two-dimensional gray image pattern based on the modulated image data supplied from the encoder 7. Here, the two-dimensional gray image pattern refers to a pattern formed by taking one of the values (e.g., 1) of each of the bits making up the modulated image data as a light spot (light) and the other (e.g., 0) as a dark spot (shade). It is to be noted that the data beam reflecting the light spot has a light intensity that consumes monomers, whereas the data beam reflecting the dark spot has a light intensity that does not lead to the consumption of monomers.

Here, the SLM 9 expresses approximately 1.6-Mbit modulated image data as a dot pattern with 1280 pixels down by 1280 pixels across. On the other hand, when the laser beam from a laser device 10 is applied to the SLM 9, the SLM 9 reflects the beam toward a Fourier transform lens 21. This reflected beam turns into a laser beam (hereinafter referred to as "data beam") reflecting the two-dimensional gray image pattern formed by the SLM 9. It is to be noted that the present invention is not limited to when the other laser beam from a PBS 13 is directly applied to the SLM 9 as shown in FIG. 1. For example, a PBS (not shown) may be provided in the optical path between the second shutter 14 and the SLM 9 such that the laser beam split by the PBS is applied to the SLM 9.

The laser device 10 emits a coherent laser beam, excellent in time and space coherence, to the first shutter 11. Among the lasers used for the laser device 10 to form a hologram on the hologram recording medium 22 are helium-neon, argon-neon, helium-cadmium, semiconductor, dye and ruby lasers.

The CPU 1 is an embodiment of a "system controller" according to the present invention. The CPU 1 exercises centralized control over the entire hologram apparatus (system). Upon receiving an instruction signal based on the recording instruction data from the playback/recording determination unit 6, the CPU 1 reads the address information from the pit formed on the hologram recording medium 22. Then, the CPU 1 sends an instruction signal to a disk control unit 24 to rotate the hologram recording medium 22 so as to irradiate the laser beam from a servo laser device 19 (hereinafter referred to as "servo laser beam") onto the pit on the hologram recording medium 22 representing the next address information.

On the other hand, the CPU 1 sends an instruction signal to a galvo mirror control unit 17 to cause this unit to adjust the inclination angle of a galvo mirror 16. The CPU 1 also calculates the number of holograms (i.e., number of pages) formed in the hologram recording medium 22 based on the data volume information from the playback/recording determination unit 6. On the other hand, the CPU 1 sends an instruction signal to each of the first and second shutter control units 12 and 15 so as to respectively open the first and second shutters 11 and 14. This initiates the hologram recording to the hologram recording medium 22. Then, at the end of the recording process based on the recording instruction data, the CPU 1 sends an instruction signal to each of the first and second shutter control unit 12 and 15 so as to respectively close the first and second shutters 11 and 14. This terminates the hologram recording to the hologram recording medium 22.

On the other hand, upon receiving an instruction signal based on the playback instruction data from the playback/recording determination unit 6, the CPU 1 sends an instruction signal to rotate the hologram recording medium 22 to the disk control unit 24 so as to irradiate the servo laser beam from the servo laser device 19 onto the pit on the hologram recording medium 22 representing the address information that corresponds to the playback instruction signal.

Further, upon receiving an instruction signal based on the playback instruction data, the CPU 1 sends an instruction signal to the first shutter control unit 12 to open the first shutter 11 and another signal to the second shutter control unit 15 to close the second shutter 14. The CPU 1 also sends an instruction signal to the galvo mirror control unit 17 to cause this unit to adjust the inclination angle of the galvo mirror 16. This initiates the hologram playback from the hologram recording medium 22. Then, when determining that the given period of time has elapsed in the playback process based on the playback instruction data, the CPU 1 sends an instruction signal to the first shutter control unit 12 to close the first shutter 11. This terminates the hologram playback from the hologram recording medium 22. It is to be noted that the CPU 1 may terminate the playback process in response to the signal based on the determination result from the DSP 32.

The first shutter control unit 12 exercises control so as to open or close the first shutter 11 based on the instruction signal from the CPU 1. The first shutter control unit 12 also exercises control so as to close the first shutter 11 based on the instruction signal from an image sensor control unit 28. When opening the first shutter 11, the first shutter control unit 12 sends an opening instruction signal to the first shutter 11. On the other hand, when closing the first shutter 11, the first shutter control unit 12 sends a closing instruction signal to the first shutter 11.

The first shutter 11 opens based on the opening instruction signal from the first shutter control unit 12. Alternatively, the first shutter 11 closes based on the closing instruction signal from the first shutter control unit 12. When the first shutter 11 closes, the laser beam from the laser device 10 is interrupted from striking the ½ wavelength plate 31.

The ½ wavelength plate 31 is provided at a given inclination so as to determine the angle for the laser beam from the laser device 10 to be applied to the PBS 13. It is to be noted that this given inclination is determined so as to achieve a desired split ratio of the two laser beams split by the PBS 13.

The PBS 13 splits the laser beam from the ½ wavelength plate 31 into two laser beams. One of the laser beams split by the PBS 13 is applied to the second shutter 14. On the other hand, the other laser beam (hereinafter referred to as "reference beam") is applied to the galvo mirror 16.

The galvo mirror 16 is an embodiment of a "mirror adjustable in inclination angle" according to the present invention. The galvo mirror 16 reflects the reference beam from the PBS 13 to the dichroic mirror 18.

The galvo mirror control unit 17 is an embodiment of a "mirror controller" according to the present invention. The galvo mirror control unit 17 adjusts the inclination angle of the galvo mirror 16 so as to adjust the angle for the reference beam, reflected by the galvo mirror 16, to be applied to the hologram recording medium 22 via the dichroic mirror 18 and the scanner lens 20, based on the instruction signal from the CPU 1. This inclination angle adjustment of the galvo mirror 16 by the galvo mirror control unit 17 is carried out during the hologram recording to ensure that the two-dimensional gray image pattern information is recorded in the hologram recording medium 22 as a hologram.

More specifically, a three-dimensional interference fringe (hologram) is formed as a result of the interference between the data and reference beams within the hologram recording medium 22. That is, as a result of the formation of a hologram in the hologram recording medium 22, the two-dimensional gray image pattern information set in the SLM 9 is recorded. On the other hand, the galvo mirror control unit 17 adjusts the inclination angle of the galvo mirror 16, that is, adjusts the incidence angle of the reference beam onto the hologram recording medium 22, to enable the angle-multiplexed recording. Here, a hologram formed in the hologram recording medium 22 is referred to as a page, and a multiplexed recorded hologram with a number of pages one above the other created by the angle-multiplexed recording as a book.

During the hologram playback, on the other hand, the galvo mirror control unit 17 adjusts the inclination angle of the galvo mirror 16 so as to apply the reference beam to the hologram formed in the hologram recording medium 22. It is to be noted that this inclination angle adjustment of the galvo mirror 16 is carried out during the hologram playback to ensure that the reference beam is applied to the hologram at the same incidence angle as the reference beam during the hologram recording.

The servo laser device 19 emits a servo laser beam to the dichroic mirror 18 so as to irradiate the beam onto a pit on the hologram recording medium 22 and detect the position of the hologram formed in the hologram recording medium 22 based on the address information represented by the pit. The servo laser beam emitted from the servo laser device 19 is a beam at a given wavelength that does not affect the hologram formed in the hologram recording medium 22. It is to be noted that a blue laser beam is used as the laser beam emitted from the laser device 10 and that a red laser beam, longer in wavelength than the blue laser beam, is used as the servo laser beam.

The emission of the servo laser beam from the servo laser device 19 begins, for example, when the hologram apparatus starts its operation, and the servo laser device 19 continues to emit the beam while the hologram apparatus remains in operation. Although the servo laser device 19 is assumed to continue its emission, the present invention is not limited thereto. During the data recording to the hologram recording medium 22 by the hologram apparatus, for example, the hologram recording medium 22 pauses. For this reason, the irradiation of the servo laser beam by the servo laser device 19 may be halted during the period of time when the irradiation of the beam onto the pit is not necessarily required. This can reduce the load derived from the emission of the servo laser beam from the servo laser device 19.

The dichroic mirror 18 transmits the reference beam reflected by the galvo mirror 16 to apply the reference beam to the scanner lens 20. On the other hand, the dichroic mirror 18 reflects the servo laser beam emitted from the servo laser device 19 to apply the laser beam to the scanner lens 20.

The scanner lens 20 refracts the reference beam, i.e., the beam incident via the dichroic mirror 18 from the galvo mirror 16 that has been adjusted in inclination angle by the galvo mirror control unit 17, so as to ensure the positive irradiation of the beam onto the hologram recording medium 22. The scanner lens 20 also applies the servo laser beam from the servo laser device 19, reflected by the dichroic mirror 18, to the hologram recording medium 22.

The second shutter control unit 15 exercises control so as to open or close the second shutter 14 based on the instruction signal from the CPU 1. When opening the second shutter 14, the second shutter control unit 15 sends an opening instruction signal to the second shutter 14. When closing the second shutter 14, on the other hand, the second shutter control unit 15 sends a closing instruction signal to the second shutter 14.

The second shutter 14 opens based on the opening instruction signal from the second shutter control unit 15. Alternatively, the second shutter 14 closes based on the closing instruction signal from the second shutter control unit 15. When the second shutter 14 closes, one of the laser beams split by the PBS 13 is interrupted from being applied to the SLM 9. It is to be noted that the second shutter 14 may be provided in the optical path of the data beam from the SLM 9 incident upon the hologram recording medium 22 via the Fourier transform lens 21.

The Fourier transform lens 21 first subjects the data beam to the Fourier transform process and then applies the beam to the hologram recording medium 22 while collecting the data beam from the SLM 9.

A photosensitive resin (e.g., photopolymer, silver salt emulsion, gelatine bichromate, photoresist), capable of storing data as a hologram, is used for the hologram recording medium 22. This resin is sealed between glass substrates to configure the hologram recording medium 22. A hologram is formed on the hologram recording medium 22 as a result of the interference between the Fourier-transformed data beam from the Fourier transform lens 21 representing a two-dimensional gray image pattern and the reference beam from the scanner lens 20. Then, the inclination angle of the galvo mirror 16 is adjusted by the galvo mirror control unit 17 to record data again on the hologram recording medium 22. The angle-multiplexed recording is carried out as a result of the interference between the reference beam from the galvo mirror 16 that has been adjusted in inclination angle and the data beam. This allows a book to be formed.

On the other hand, wobbles are, for example, formed in advance on the glass substrates making up the hologram recording medium 22 so that address information is formed in advance in the wobbles as pits to determine the positions of the holograms formed on the hologram recording medium 22. Then, the servo laser beam, incident from the scanner lens 20 and emitted from the servo laser device 19, is irradiated onto the pit representing the address information. After the irradiation onto the pit representing the address information, the servo laser beam is applied to the detector 23.

Further, a test region is established in advance in the hologram recording medium 22 to record each piece of test image data ($\theta r \pm n \cdot \Delta \theta$: where n is a natural number) corresponding to each of the reference incidence angle and a plurality of stepped incidence angles ($\theta r \pm n \cdot \Delta \theta$: where n is a natural number) of the recording reference beam during the recording to the hologram recording medium 22 that are set with the reference incidence angle therebetween. It is to be noted that the test region and the test image data will be described later in detail.

The Fourier transform lens 26 receives the beam (hereinafter referred to as "playback beam") diffracted by the hologram recorded in the hologram recording medium 22 when the reference beam is applied to the hologram recording medium 22 during the hologram playback. It is to be noted that the incidence angle of the reference beam during the hologram playback must be the same as that of the reference beam during the recording of the hologram to be played back. Then, the Fourier transform lens 26 emits the inverse-Fourier-transformed playback beam to the image sensor 27.

The image sensor 27 receives the inverse-Fourier-transformed playback beam from the Fourier transform lens 26. The image sensor 27 is configured, for example, with a CCD or CMOS sensor to reproduce, from the playback beam, the two-dimensional gray image pattern set in the SLM 9. Here, the reproduced two-dimensional gray image pattern is referred to as a captured image pattern. The image sensor 27 converts the lightness or darkness of the captured image pattern into the difference in electric signal intensity based on the instruction signal from the image sensor control unit 28. Then, the image sensor 27 supplies, to a filter 29, the modulated image data in analog quantity corresponding to the light intensity of the lightness or darkness of the captured image pattern. It is to be noted that if the image sensor control unit 28 determines that the image sensor 27 has been irradiated with the playback beam with the given light intensity or more in the present embodiment, the image sensor control unit 28 sends an instruction signal to the first shutter control unit 12 to close the first shutter 11.

On the other hand, we assume that the SLM 9 and the image sensor 27 can both create image patterns of the same size (e.g., 1280 pixels by 1280 pixels) in the present embodiment. It is to be noted that while we assume that the SLM 9 and the image sensor 27 can both create image patterns of the same size in the present embodiment, the present invention is not limited thereto. For example, the image size of the image sensor 27 may be larger than that of the SLM 9. If the image size of the image sensor 27 is larger than that of the SLM 9, the playback beam from the Fourier transform lens 26 will be positively irradiated onto the image sensor 27. This allows the positive reproduction of the two-dimensional gray image pattern set in the SLM 9. Moreover, if the image size of the image sensor 27 is larger, the need will be lightened for the image sensor control unit 28 to move the image sensor 27 to a given position with high precision.

The filter 29 filters the modulated image data in analog quantity supplied from the image sensor 27 to enhance the separability of the binarization process by a decoder 30. That is, the captured image pattern loaded into the image sensor 27 may have a degraded separability between the light and dark spots as compared with the two-dimensional gray image pattern set in the SLM 9 due, for example, to noise to which the data and playback beams are subjected. In this case, the decoder 30 cannot properly determine whether the modulated image data in analog quantity is at the level representing the light or dark spot. This leads to an inappropriate binarization process. For this reason, the filter 29 corrects the level of the modulated image data in analog quantity as its filtering process.

It is to be noted that a binarization process unit (not shown) is provided between the filter 29 and the decoder 30 to proceed with the binarization process on the modulated image data filtered by the filter 29 in the present embodiment. Then, the binarized modulated image data in digital quantity is supplied to the decoder 30.

The decoder 30 carries out the decoding process such as error correction on the modulated image data from the filter 29.

The detector 23 receives the servo laser beam emitted from the servo laser device 19 after the irradiation of the beam onto the pit representing the address information formed on the hologram recording medium 22. The detector 23 is, for example, made up of a four-part photodiode to send the light intensity information of the servo laser beam detected by the four-part photodiode to the disk control unit 24. The detector 23 also sends the address information to the CPU 1 based on the servo laser beam irradiated onto the pit representing the address information.

The disk control unit 24 servo-controls the disk drive unit 25 based on the light intensity information of the servo laser beam from the detector 23. The disk control unit 24 also sends an instruction signal to the disk drive unit 25 to rotate the hologram recording medium 22 during the playback or recording so as to irradiate the servo laser beam onto the pit representing the desired address information of the hologram recording medium 22 based on the instruction signal from the CPU 1. The disk control unit 24 also sends an instruction signal to the disk drive unit 25 to rotate the hologram recording medium 22 so as to allow the formation of a hologram at other position of the hologram recording medium 22 when the book is formed in the hologram recording medium 22.

A non-volatile memory is, for example, used for the memory 2. The memory 2 stores in advance the program data used by the CPU 1 to proceed with the above-described processes. The memory 2 also stores the address information from the pits formed on the hologram recording medium 22. Further, the memory 2 stores information of the test region, established in advance in the hologram recording medium 22, and the test image data. Still further, the memory 2 stores the correction amount of the inclination angle of the galvo mirror 16 that has previously been corrected by the DSP 32.

The DSP (Digital Signal Processor) 31 is an embodiment of a "mirror inclination angle corrector" according to the present invention. That is, as illustrated in FIG. 10, a discrepancy occurs in the incidence angle of the reference beam during the recording (hereinafter referred to as "recording reference beam") or reference beam during the playback (hereinafter referred to as "playback reference beam") between before and after the volume change of the hologram recording medium. The DSP 32 corrects the inclination angle of the galvo mirror 16 so as to correct the discrepancy in the incidence angle of the recording reference beam or playback reference beam.

It is to be noted that the "mirror inclination angle corrector" according to the present invention is not limited to the DSP 32 and may be included in the galvo mirror control unit 17 or the CPU 1. On the other hand, the galvo mirror control unit 17 may be included in the CPU 1. It is to be noted, however, that, to lighten the load of the CPU 1 in charge of system control, a task that generally heavily burdens the CPU 1, it is more preferred to provide the galvo mirror control unit 17 and the DSP 32 on a standalone basis as shown in FIG. 1.

<Test Region>

Figure 2:
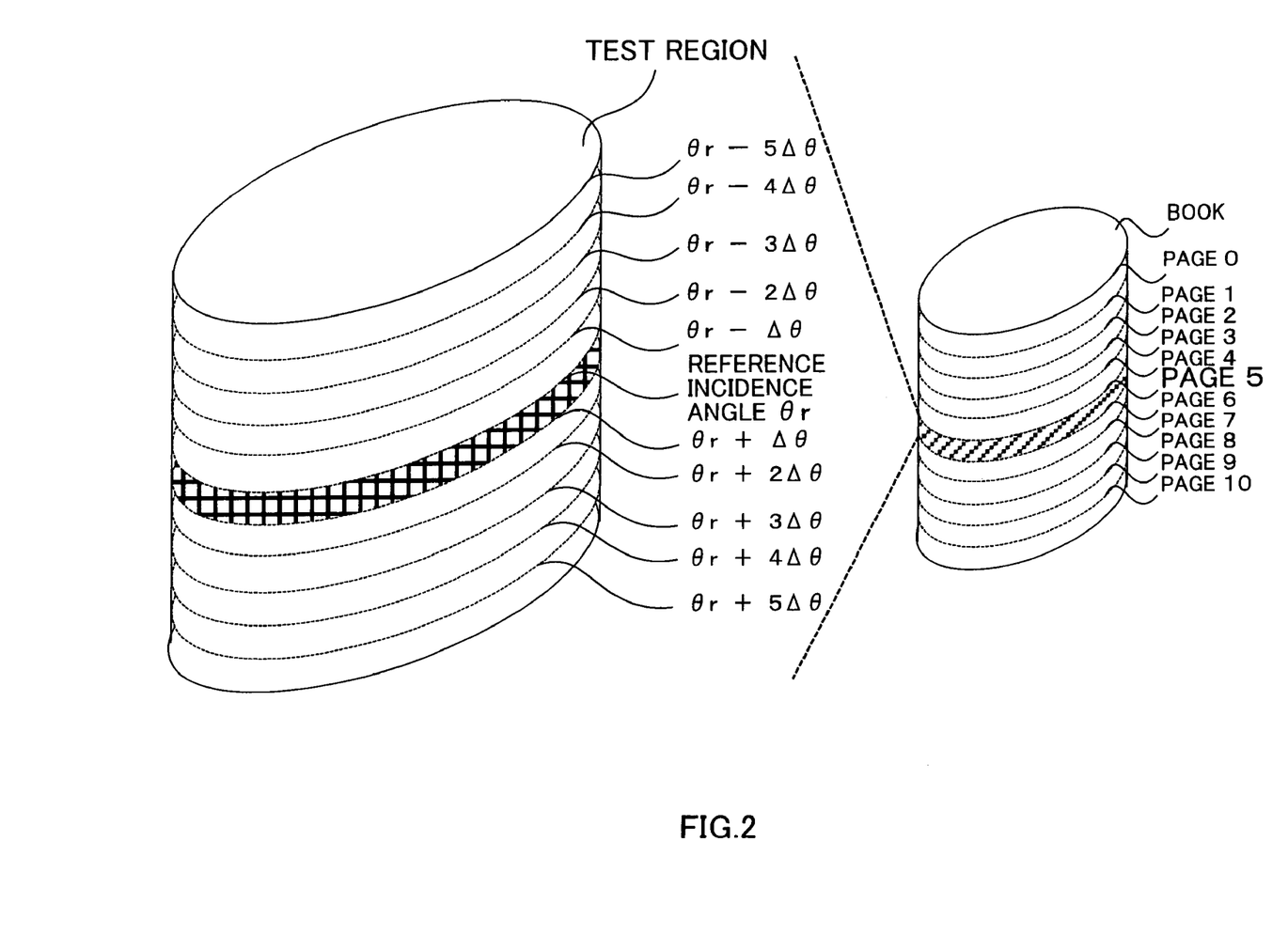
FIG. 2 illustrates a test region according to an embodiment of the present invention.

FIG. 2 is an explanatory view of the test region according to an embodiment of the present invention.

First, we assume that a book, that allows the angle-multiplexed recording in the same region, is made up of a total of 11 pages in a hologram recording medium. That is, we assume that the angle-multiplexed recording equivalent at 11 reference incidence angles (e.g., 1°) can be achieved in a single book in normal mode. It is to be noted that one book, naturally not limited to 11 pages, is the number of pages within the range that allows for the angle-multiplexed recording. It is also to be noted that one page is the unit of hologram recording or playback.

Next, page 5, the middle page among pages 0 to 10 in the given book, is determined in advance as the minimum unit of the test region in the hologram recording medium. It is to be noted that the minimum unit of the test region is not limited to the middle page in the given book and may be any page therein. Further, the minimum unit of the test region is not limited to one page and may be made up of a plurality of pages.

Then, the test region is divided into partitioned regions, one region (hereinafter referred to as "partitioned region $\theta r$") recording a test hologram corresponding to a reference incidence angle $\theta r$ and the other regions (hereinafter referred to as "partitioned regions $(\theta r \pm n \cdot \Delta \theta)$") each recording a test hologram corresponding to one of a plurality of stepped incidence angles $(\theta r \pm n \cdot \Delta \theta)$. It is to be noted that fn=1 to 5J in the example shown in FIG. 2. The partitioned regions $(\theta r \pm n \cdot \Delta \theta)$ are made up of the partitioned regions $(\theta r + \Delta \theta)$ to $(\theta r + 5\Delta \theta)$ in the positive direction and the partitioned regions $(\theta r - \Delta \theta)$ to $(\theta r - 5\Delta \theta)$ in the negative direction with the partitioned region $\theta r$ in the center therebetween. It is to be noted that the maximum number of n is not limited to '5' and determined in the range that allows for the angle-multiplexed recording. That is, $\Delta \theta$ is set equal to the angle obtained by dividing the reference incidence angle by 2n (e.g., 0.01°).

Here, the test region illustrated in FIG. 2 is compared with the recording of one of the test holograms corresponding to the reference incidence angle $\theta r$ or one of the plurality of the stepped incidence angles $(\theta r \pm n \cdot \Delta \theta)$ per page of a book, that is, the normal recording of a test hologram per page. As compared with the comparative example, the test region illustrated in FIG. 2 requires only one page, namely, the unit of hologram recording/playback. This saves the region in the hologram recording medium 22 required as the test region.

Further, the test region illustrated in FIG. 2 is made up of one page, namely, the unit of hologram recording/playback. This allows the image sensor 27 to load all the test holograms by a single playback, that is, to globally play back these test holograms. Therefore, the test holograms need be played back only the minimum number of times or only once from the test region in the inclination angle correction process of the galvo mirror 16 according to the present invention.

<Test Image Data>

Figure 3:
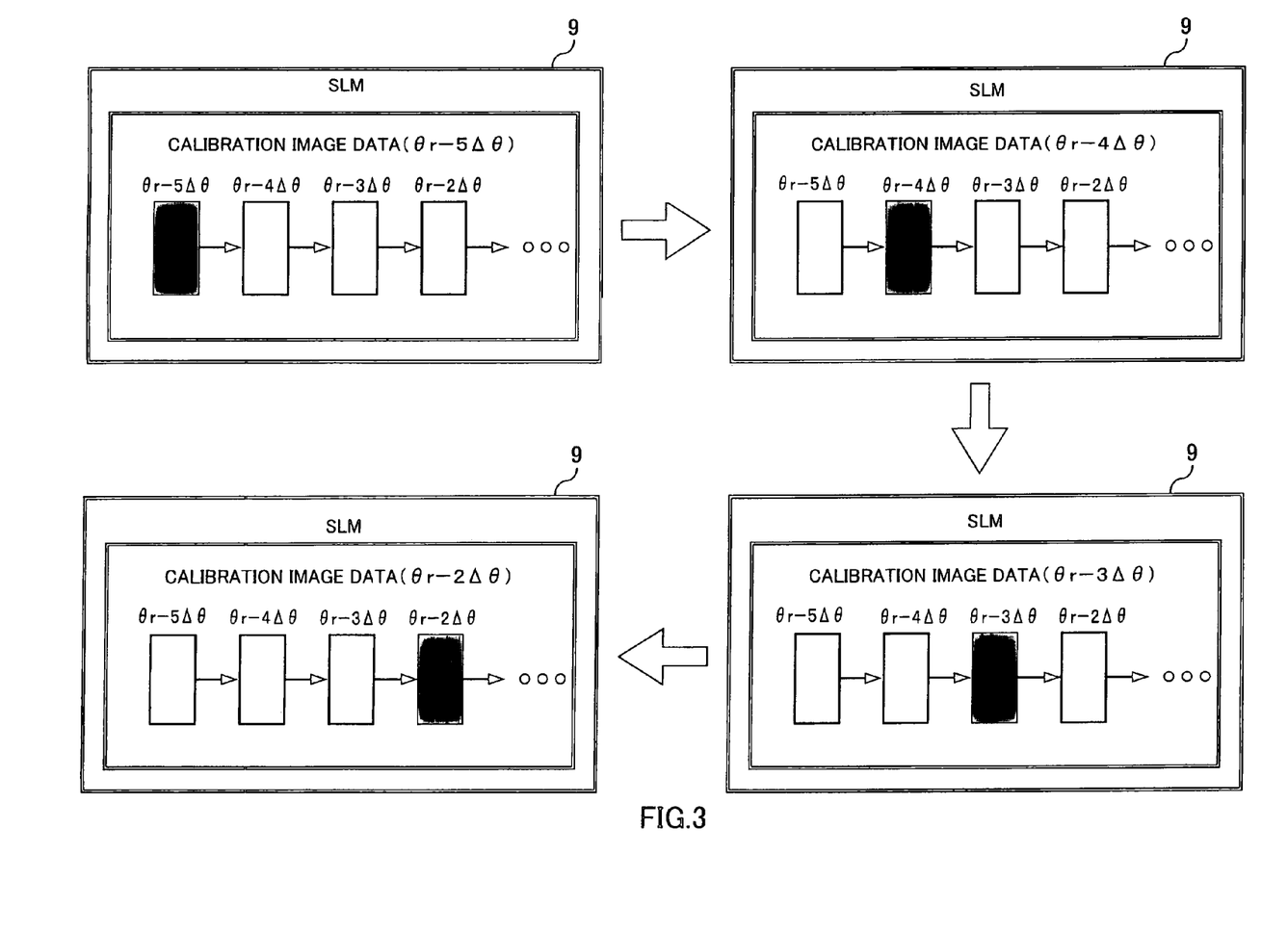
FIG. 3 illustrates test image data set in an SLM corresponding to a test hologram according to an embodiment of the present invention.

FIG. 3 illustrates the test image data set in the SLM 9 corresponding to the test holograms according to an embodiment of the present invention. It is to be noted that we assume that the test region is divided into 11 regions, namely, the partitioned region $\theta r$ and the partitioned regions $(\theta r \pm n \ (1 \text{ to } 5) \cdot \Delta \theta)$. It is also to be noted that we assume that the test image data is made up of 11 pixels. The test image data is an embodiment of "test data" according to the present invention.

We assume that a pixel corresponding to the partitioned region $(\theta r - 5\Delta \theta)$ is set equal to the level representing a light spot ("1"), whereas the other 10 pixels are set equal to the level representing a dark spot ("0") in test image data $(\theta r - 5\Delta \theta)$ corresponding to the partitioned region $(\theta r - 5\Delta \theta)$, as illustrated in FIG. 3.

We assume that a pixel corresponding to the partitioned region $(\theta r - 4\Delta \theta)$ is set equal to the level representing a light spot ("1"), whereas the other 10 pixels are set equal to the level representing a dark spot ("0") in test image data $(\theta r - 4\Delta \theta)$ corresponding to the partitioned region $(\theta r - 4\Delta \theta)$.

We assume that a pixel corresponding to the partitioned region $(\theta r - 3\Delta \theta)$ is set equal to the level representing a light spot ("1"), whereas the other 10 pixels are set equal to the level representing a dark spot ("0") in test image data $(\theta r - 3\Delta \theta)$ corresponding to the partitioned region $(\theta r - 3\Delta \theta)$.

We assume that a pixel corresponding to the partitioned region $(\theta r - 2\Delta \theta)$ is set equal to the level representing a light spot ("1"), whereas the other 10 pixels are set equal to the level representing a dark spot ("0") in test image data $(\theta r - 2\Delta \theta)$ corresponding to the partitioned region $(\theta r - 2\Delta \theta)$.

It is to be noted that test image data for a total of the seven partitioned regions $(\theta r - \Delta \theta)$ to $(\theta r + 5\Delta \theta)$ is similarly set in addition to the examples shown in FIG. 3. Then, the test image data for the 11 partitioned regions set in the SLM 9 is recorded in sequence on the hologram recording medium 22. Eventually, the test holograms representing a light spot will be multiplex-recorded in all the partitioned regions of the test region.

Thus, we assume that each of the test holograms is recorded based on two-dimensional gray image data having, among a plurality of pixels corresponding to the test region, a pixel corresponding to the reference incidence angle $\theta r$ or one of the plurality of the stepped incidence angles $(\theta r \pm n \cdot \Delta \theta)$ set equal to the level representing a light spot and the other pixels to the level representing a dark spot.

This firstly prevents the recording of meaningless holograms in regions other than the test region in the hologram recording medium 22. On the other hand, a test hologram representing a light spot is recorded in sequence in the partitioned region $\theta r$ and the partitioned regions $(\theta r \pm n \ (1 \text{ to } 5) \cdot \Delta \theta)$ in the test region. This allows to suppress the monomer consumption to a required minimum during the sequential recording of the test holograms to the test region.

It is to be noted that the multiplex-recorded test holograms in the test region are globally played back by the image sensor 27 through the playback system control by the CPU 1. It is to be noted that if, for example, the test region corresponds to page 5 among 11 pages in a book as illustrated in FIG. 2, the reference incidence angle $\theta r$ of the playback reference beam corresponding to page 5 is set.

Figure 4:
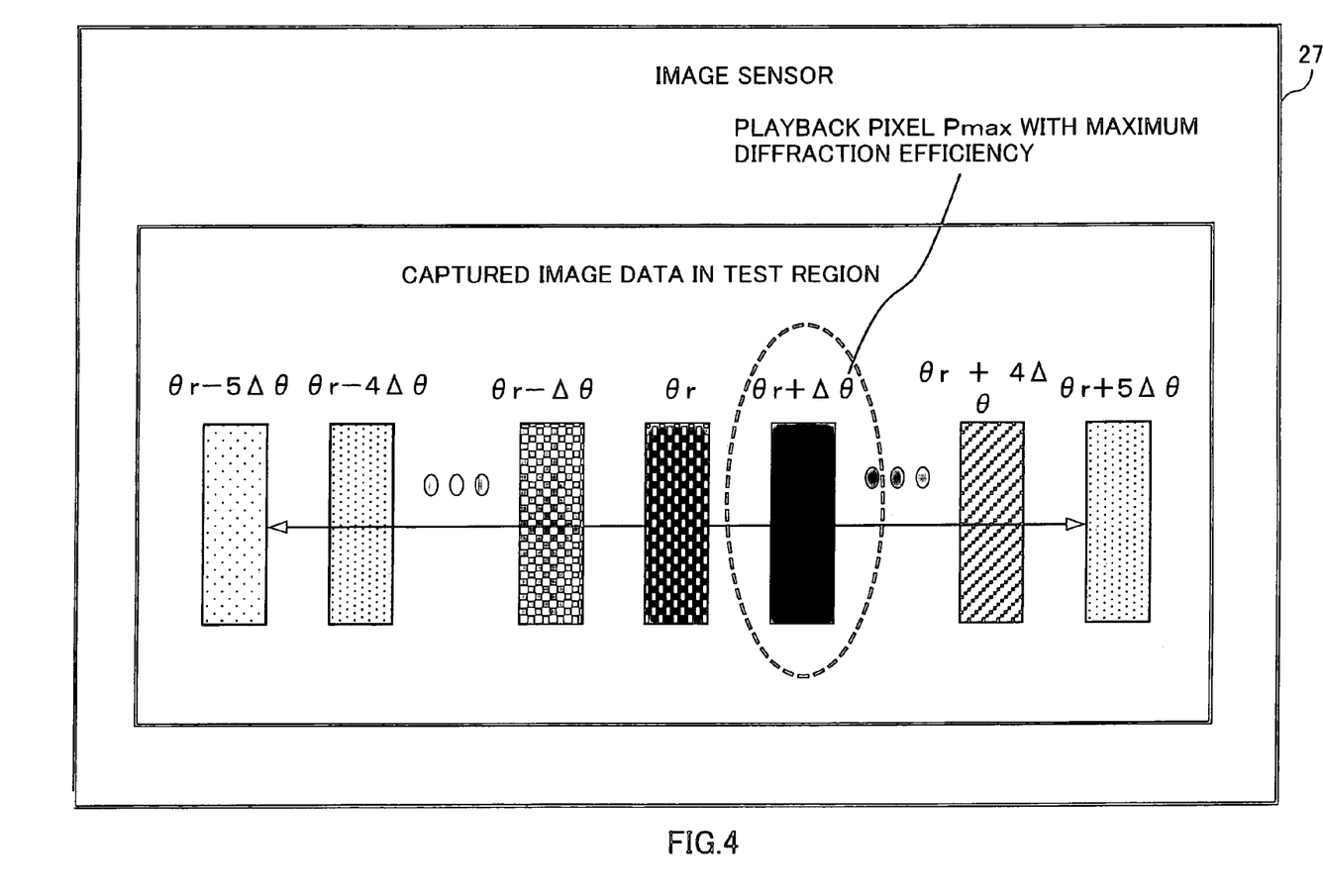
FIG. 4 illustrates captured image data corresponding to the test region that has been globally played back by an image sensor according to an embodiment of the present invention.

FIG. 4 illustrates the captured image data in the test region globally played back by the image sensor 27. In an ideal condition with no volume change of the hologram recording medium 22, the playback pixel corresponding to the partitioned region $\theta r$ in the test region has the maximum diffraction efficiency. In reality, however, the hologram recording medium 22 changes in volume, for example, as a result of change in molecular structure. This causes a discrepancy in the reference incidence angle $\theta r$. Therefore, the playback pixel corresponding to the partitioned region $(\theta r + \Delta \theta)$ in the test region has the maximum diffraction efficiency rather than that corresponding to the partitioned region $\theta r$, as illustrated in FIG. 4.

Figure 5:
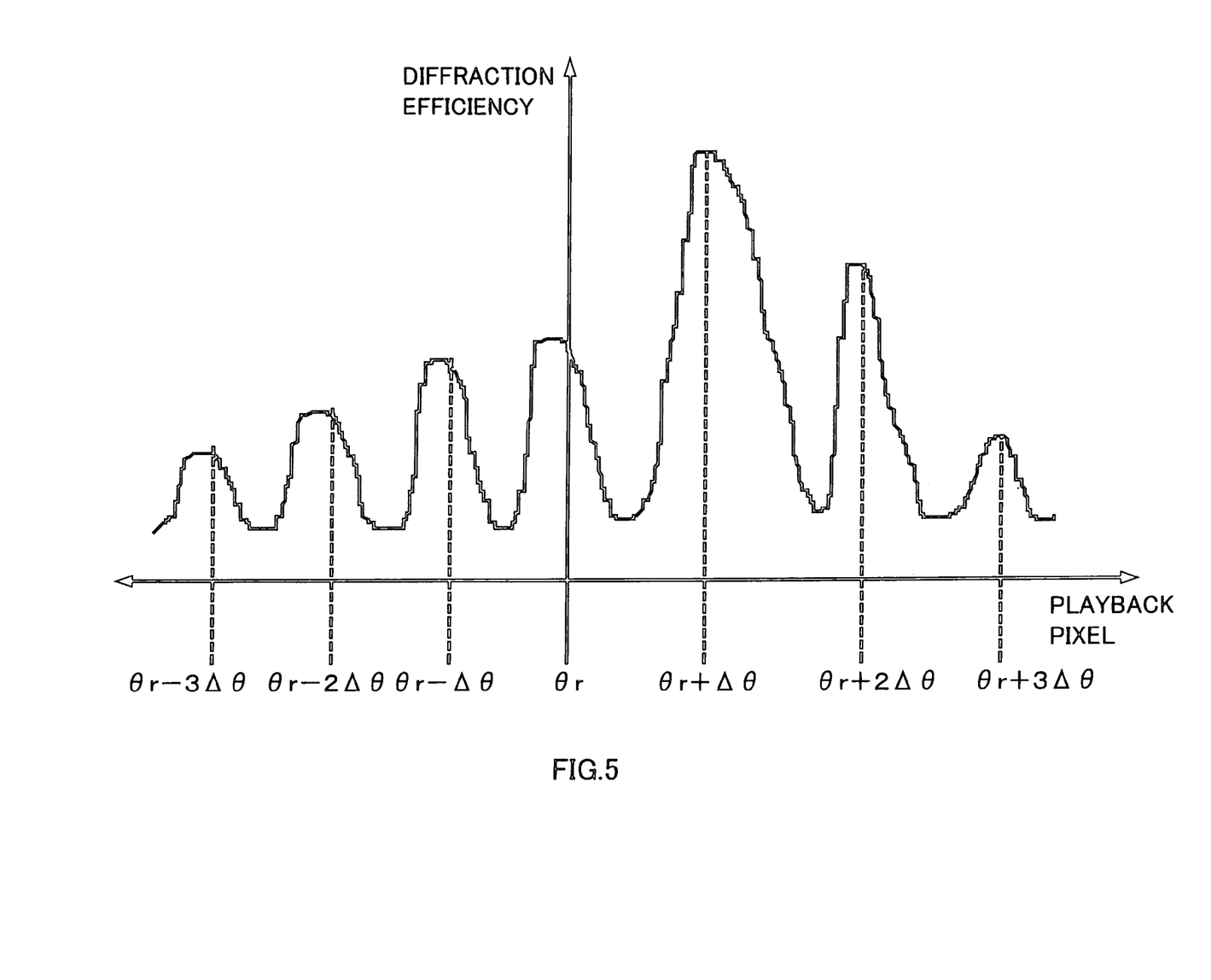
FIG. 5 illustrates the relationship between playback pixels in captured image data corresponding to the test region and diffraction efficiency according to an embodiment of the present invention.

FIG. 5 illustrates a characteristic curve of the captured image data in the test region illustrated in FIG. 4. Each of the peak levels in the characteristic curve corresponds to the diffraction efficiency of the playback pixel in one of the partitioned regions in the test region. In FIG. 5, the playback pixel corresponding to the partitioned region $(\theta r + \Delta \theta)$ has the maximum diffraction efficiency in the test region. In this case, therefore, a discrepancy of $\Delta \theta$ has occurred in the positive direction with respect to the reference incidence angle $\theta r$ as a result of the volume change of the hologram recording medium 22. Consequently, if the correction process, a process adapted to adjust the inclination angle of the galvo mirror 16 so as to move the incidence angle of the playback reference beam from the reference incidence angle $\theta r$ in the positive direction by $\Delta \theta$, is carried out, the holograms will be properly played back and recorded.

It is to be noted that the maximum diffraction efficiency is determined as the gradation level representing the lightest spot of all the plurality of the playback pixels corresponding to the test region in the captured image data loaded into the image sensor 27 during the global playback of the test holograms. That is, the diffraction efficiency, a conceptual parameter, can be determined readily and quantitatively as something that represents the maximum gradation level of all the playback pixels in the captured image data.

<Operation of the Hologram Apparatus>

Description will be given below of the flow of the inclination angle correction process of the galvo mirror 16.

===Recording of Test Holograms===

Figure 6:
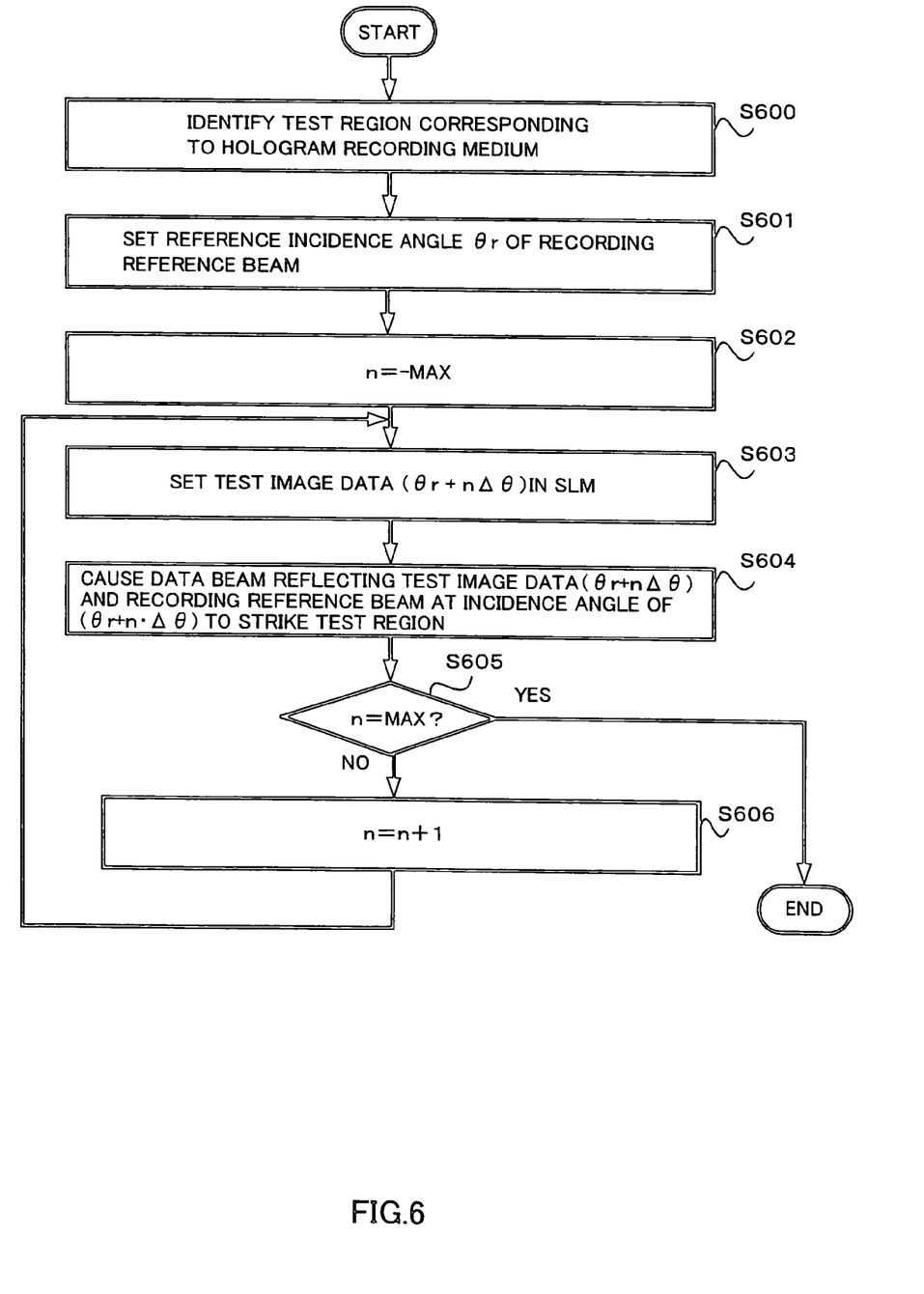
FIG. 6 is a flowchart describing the operation of the hologram apparatus according to an embodiment of the present invention.

Description will be given first of a series of operations of the hologram apparatus from the beginning to end of the recording of test holograms.

Upon receiving an instruction signal from external host equipment (not shown) based on recording or playback instruction data via the interface 3 or the playback/recording determination unit 6, the CPU 1 reads address information from a pit on the hologram recording medium 22, for example, through the rotation of the hologram recording medium 22 or the tracing of pits thereon with a laser beam. At this time, the CPU 1 identifies the test region established in advance in the hologram recording medium 22 from the address information read at this time (S600). It is to be noted that if the address information of the test region is known in advance, the address information may be stored in the memory 2 so that the CPU 1 reads the address information of the test region from the memory 2 to identify the test region.

Before the beginning of the recording of the test holograms to the test region, the CPU 1 causes the galvo mirror control unit 17 to adjust the inclination angle of the galvo mirror 16 so as to set the reference incidence angle θr of the recording reference beam corresponding to the test region (S601). That is, the CPU 1 sends an instruction signal to the galvo mirror control unit 17 to adjust the inclination angle of the galvo mirror 16 to an angle corresponding to the reference incidence angle θr. This causes the inclination angle of the galvo mirror 16 to be adjusted to the angle corresponding to the reference incidence angle θr. Before the beginning of the recording of the test holograms to the test region, the CPU 1 also sends an instruction signal to each of the first and second shutter control units 12 and 15 so as to respectively open the first and second shutters 11 and 14. This respectively opens the first and second shutters 11 and 14. As a result, the data beam and the recording reference beam can be applied to the hologram recording medium 22.

Here, a variable n, whose minimum and maximum values are respectively −MAX and MAX, is set to −MAX for convenience of description (S602). In this case, the CPU 1 sets test image data (θr+nΔθ) corresponding to the reference incidence angle θr stored in advance in the memory 2, namely, test image data (θr−MAX·Δθ), in the SLM 9 via the processes by the encoder 7 and the mapping process unit 8 (S603). This causes the data beam at the incidence angle of θd reflecting the test image data (θr−MAX·Δθ) and the recording reference beam set equal to the stepped incidence angle of (θr−MAX·Δθ) to be respectively applied to the test region (S604). That is, the test hologram corresponding to the test image data (θr−MAX·Δθ) is recorded in the test region.

Next, the current variable n is not MAX (S605: NO), and therefore, the variable n is incremented by "+1" (S606). Here, the variable n is set equal to "−MAX+1." In this case, the CPU 1 sets test image data (θr+(−MAX+1)·Δθ). corresponding to the stepped incidence angle (θr+(−MAX+1)·Δθ) stored in advance in the memory 2 in the SLM 9 via the processes by the encoder 7 and the mapping process unit 8 (S603). This causes the data beam at the incidence angle of θd reflecting the test image data (θr+(−MAX+1)·Δθ) and the recording reference beam set equal to the stepped incidence angle of (θr+(−MAX+1)·Δθ) to be respectively applied to the test region (S604). That is, the test hologram corresponding to the test image data (θr+(−MAX+1)·Δθ) is recorded in the test region.

Thus, the processes from S603 to S606 are repeated until the variable n reaches MAX (S605: YES). Eventually, the test holograms corresponding to all pieces of the test image data (θr+MAX·Δθ) to θr (reference incidence angle) and to (θr−MAX·Δθ) are recorded in the test region.

Figure 7:
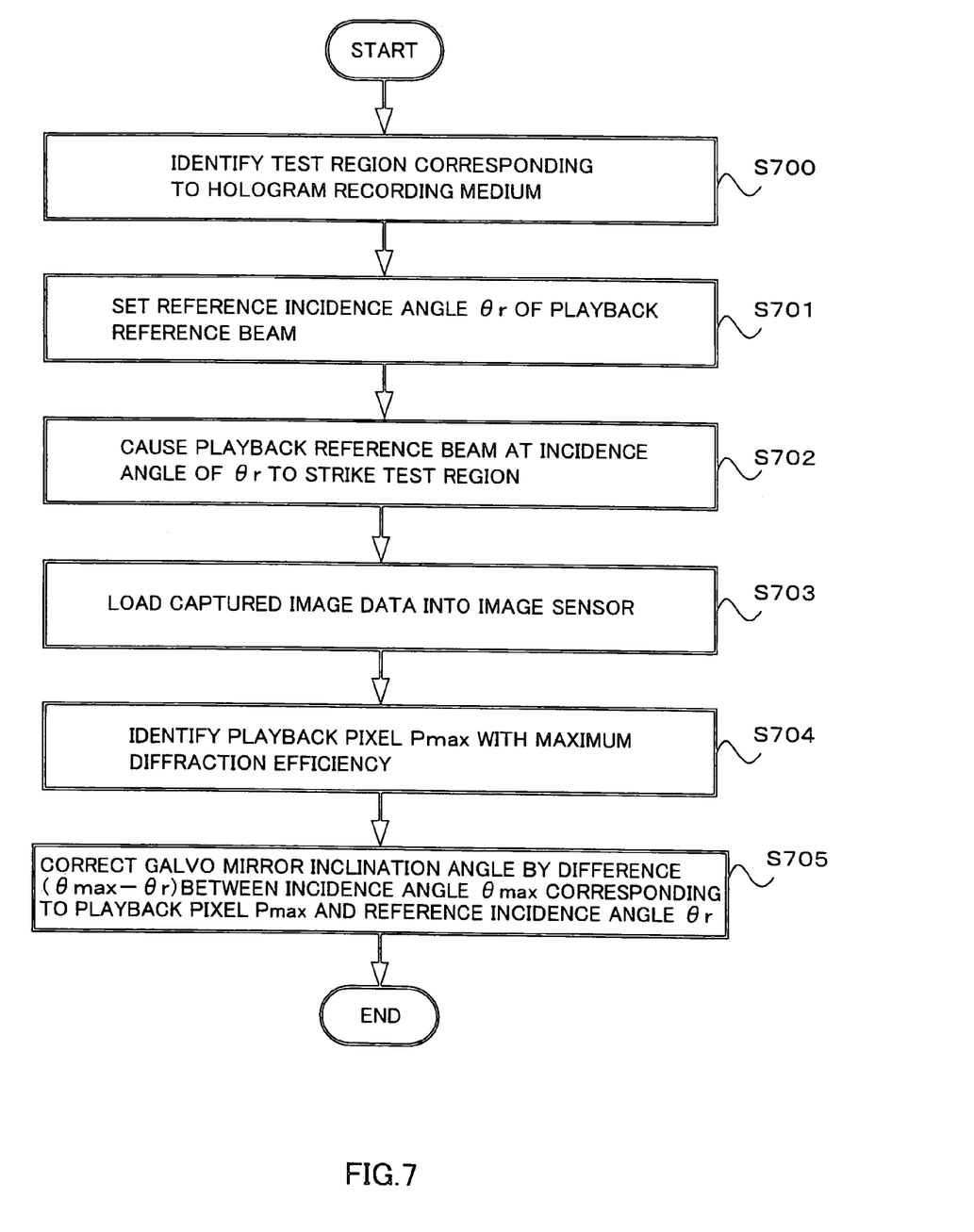
FIG. 7 is a flowchart describing the operation of the hologram apparatus according to an embodiment of the present invention.

Description will be given next of a series of operations of the hologram apparatus from the playback of the test holograms to the correction of the inclination angle of the galvo mirror 16 based on the flowchart in FIG. 7.

===Inclination Angle Correction of the Galvo Mirror===

First, the CPU 1 identifies the test region recording the test holograms based on the address information read from the pit on the hologram recording medium 22 (S700), as at the beginning of the test hologram recording (S600). Before the beginning of the global playback of all the test holograms from the test region, the CPU 1 also causes the galvo mirror control unit 17 to adjust the inclination angle of the galvo mirror 16 so as to set the reference incidence angle θr of the recording reference beam corresponding to the test region (S701). That is, the CPU 1 sends an instruction signal to the galvo mirror control unit 17 to adjust the inclination angle of the galvo mirror 16 to an angle corresponding to the reference incidence angle θr. This causes the inclination angle of the galvo mirror 16 to be adjusted to the angle corresponding to the reference incidence angle θr.

The CPU 1 also sends an instruction signal to the first shutter control unit 12 to open the first shutter 11 and another signal to the second shutter control unit 15 to close the second shutter 14 before the beginning of the global playback of all the test holograms from the test region. This opens the first shutter 11 and closes the second shutter 14. As a result, only the playback reference beam can be applied to the hologram recording medium 22.

The CPU 1 causes the playback reference beam to be applied to the test region of the hologram recording medium 22 at the reference incidence angle θr (S702). This causes the CPU 1 to globally play back all the test holograms based on a diffracted light obtained from the test region of the hologram recording medium 22. At this time, the captured image data corresponding to the test region is loaded into the image sensor 27 (S703).

The DSP 32 selects, from among all the test holograms played back from the test region of the hologram recording medium 22, the hologram with the maximum diffraction efficiency. More specifically, the DSP 32 selects, from among the playback pixels in the captured image data corresponding to the test region, a playback pixel Pmax with the gradation level representing the lightest spot (S704).

The DSP 32 sends an instruction signal to the galvo mirror control unit 17 to correct the inclination angle of the galvo mirror 16 so as to eliminate a difference (θmax−θr) between an incidence angle θmax, that is either the reference incidence angle θr or one of the plurality of the stepped incidence angles (θr±n·Δθ) corresponding to the playback pixel Pmax, and the reference incidence angle θr. This causes the inclination angle of the galvo mirror 16 to be corrected by the galvo mirror control unit 17 correspondingly with the volume change (e.g., contraction, expansion) of the hologram recording medium 22.

Thus, the inclination angle correction of the galvo mirror 16 by the DSP 32 allows to properly avoid potential defective conditions resulting from the volume change (e.g., contraction, expansion) of the hologram recording medium 22 during the hologram recording and playback. Further, a proper inclination angle of the galvo mirror 16 corresponding to the volume change of the hologram recording medium 22 can be efficiently searched for by a single playback from the test region of the hologram recording medium 22 rather than search for a proper inclination angle of the galvo mirror 16 corresponding to the volume change of the hologram recording medium 22 by trial and error as has been conventionally done. This contributes to faster hologram recording/playback process.

It is to be noted that the CPU 1 sends an instruction signal to the DSP 32 to correct the inclination angle of the galvo mirror 16 correspondingly with the volume change of the hologram recording medium 22 in the aforementioned embodiment before the beginning of the hologram recording or playback. On the other hand, upon receiving the above instruction signal from the CPU 1, the DSP 32 begins to correct the inclination angle of the galvo mirror 16. That is, the inclination angle of the galvo mirror 16 is always corrected before the beginning of the hologram recording or playback. This allows to steadily avoid potential defective conditions of the hologram recording and playback resulting from the volume change of the hologram recording medium 22.

In the aforementioned embodiment, on the other hand, the DSP 32 may store the current correction amount of the inclination angle of the galvo mirror 16 in the memory 2 so as to reuse the current correction amount thereof during the next hologram recording or playback. Then, the DSP 32 reads the correction amount stored in advance in the memory 2 during the next hologram recording or playback to send an instruction signal based on that correction amount to the galvo mirror control unit 17 to correct the inclination angle of the galvo mirror 16. This eliminates the need to play back the test holograms one after another from the test region during the hologram recording or playback. As a result, the inclination angle of the galvo mirror 16 can be corrected.

While embodiments of the present invention have been described, it should be understood that the aforementioned embodiments are intended for easy understanding of the present invention and not intended for restrictive interpretation of the invention. The present invention can be changed or modified without departing from the essence thereof and includes the equivalents thereof.

What is claimed is:

1. A hologram apparatus for causing a coherent data beam reflecting data to be recorded and a coherent recording reference beam after being reflected by a mirror adjustable in inclination angle to be applied to a hologram recording medium to record a hologram so as to form interference fringes and for playing back a hologram based on a diffracted light obtained as a result of applying a coherent playback reference beam after being reflected by the mirror to the hologram recording medium at the same incidence angle as the recording reference beam, a test region being established in advance in the hologram recording medium, the test region being adapted to record a piece of test data for each of the reference incidence angle and a plurality of stepped incidence angles of the recording reference beam, the hologram apparatus comprising:

a mirror controller that adjusts the inclination angle of the mirror;

a system controller that successively adjusts the inclination angle of the mirror so as to set the incidence angle of the recording reference beam equal to the reference incidence angle or one of the plurality of the stepped incidence angles, successively records in the test region the piece of the test data corresponding to the reference incidence angle or one of the plurality of the stepped incidence angles that is successively set, and applies the playback reference beam to the test region at the same incidence angle as the recording reference beam to globally play back all the pieces of the test data that have been successively recorded; and a mirror inclination angle corrector that selects, among the test data that has been globally played back, the data with the maximum diffraction efficiency, and corrects the inclination angle of the mirror based on the difference between the reference incidence angle or one of the plurality of the stepped incidence angles corresponding to the selected data and the reference incidence angle.

2. The hologram apparatus of claim 1, wherein the minimum unit of the test region is a given region, equivalent to one page that is the unit of hologram recording and playback, divided at each of the reference incidence angle and the plurality of the stepped incidence angles.

3. The hologram apparatus of claim 1,
wherein the data beam is obtained as a reflected light when a given laser beam is applied to a spatial light modulator with a two-dimensional gray image data to be recorded, and
wherein the pieces of the test data each have, among a plurality of pixels corresponding to the test region, a pixel corresponding to the reference incidence angle or one of the plurality of the stepped incidence angles set equal to the level representing a light spot and the other pixels set equal to the level representing a dark spot.

4. The hologram apparatus of claim 3, wherein the maximum diffraction efficiency is a gradation level representing the lightest spot of the plurality of the pixels of captured image data corresponding to the test region in the captured image data loaded into an image sensor provided in the optical path of the playback reference beam during the global playback of the pieces of the test data.

5. The hologram apparatus of claim 1, wherein the system controller instructs the mirror inclination angle corrector to carry out the correction before the beginning of the hologram recording or playback.

6. The hologram apparatus of claim 1, having a memory adapted to store a previous correction amount of the inclination angle of the mirror, wherein the mirror inclination angle corrector carries out a current correction of the inclination angle of the mirror based on the correction amount read from the memory.

7. A hologram recording and playback method of a hologram apparatus for causing a coherent data beam reflecting data to be recorded and applying a coherent recording reference beam to a hologram recording medium to record a hologram so as to form interference fringes and for playing back a hologram based on a diffracted light obtained as a result of applying a coherent playback reference beam to the hologram recording medium at the same incidence angle as the recording reference beam, the hologram recording and playback method comprising:

establishing in advance a test region adapted to record a piece of test data for each of the reference incidence angle and a plurality of stepped incidence angles of the recording reference beam in the hologram recording medium;

successively setting the incidence angle of the recording reference beam equal to the reference incidence angle or one of the plurality of the stepped incidence angles and successively recording in the test region a piece of the test data corresponding to the reference incidence angle or one of the plurality of the stepped incidence angles that is successively set;

applying the playback reference beam to the test region at the same incidence angle as the recording reference beam to globally play back all the pieces of the test data that have been successively recorded;

selecting, among the test data that has been globally played back, the data with the maximum diffraction efficiency; and correcting the incidence angle of the recording reference beam or the playback reference beam based on the difference between the reference incidence angle or one of the plurality of the stepped incidence angles corresponding to the selected data and the reference incidence angle.

8. An apparatus comprising:

a first processor configured to cause, in a single playback and using a coherent beam disposed at a reference incidence angle, a test hologram corresponding to a first partitioned region of a holographic recording medium and a test hologram corresponding to each of at least one second partitioned region of the holographic recording medium to be globally played back, the first partitioned region being associated with the reference incidence angle of the coherent beam and the at least one second partitioned region each being associated with a stepped incidence angle of the coherent beam;

a second processor configured to automatically select a test hologram with a maximum diffraction efficiency from the globally played-back test holograms; and a mirror control unit configured to automatically correct an inclination angle of a mirror for adjusting an incidence angle of the coherent beam based on the stepped incidence angle associated with the partitioned region that corresponds to the automatically-selected test hologram.

9. The apparatus of claim 8, wherein the mirror control unit is configured to automatically correct the inclination angle based on a difference between the reference incidence angle and the stepped incidence angle associated with the partitioned region that corresponds to the automatically-selected test hologram.

10. The apparatus of claim 8, wherein the first partitioned region is disposed in a middle page of a test region of the holographic recording medium.

11. The apparatus of claim 8, wherein the reference incidence angle is expressed as:

$\theta r,$ wherein the stepped incidence angles are expressed as:

$(\theta r \pm n \cdot \Delta \theta),$ and wherein n is a positive integer.

12. The apparatus of claim 8, wherein the globally played-back test hologram with the maximum diffraction efficiency is automatically selected based on selecting a playback pixel $P_{max}$ with a gradiation level representing a lightest spot of all of a plurality of pixels in the global play-back.

13. The apparatus of claim 8, wherein the at least one second partitioned region includes a plurality of partitioned regions, and wherein the first processor is further configured to cause, in the single playback and using the coherent beam at the reference incidence angle, a test hologram corresponding to each of the plurality of partitioned regions of the holographic recording medium to be globally played back, the plurality of partitioned regions each being associated with a stepped incidence angle of the coherent beam.

14. The apparatus of claim 8, further comprising a storage medium configured to store the stepped incidence angle associated with the partitioned region that corresponds to the automatically-selected test hologram.

15. The apparatus of claim 8, wherein the second processor comprises a digital signal processor.

16. The apparatus of claim 8, wherein the mirror control unit comprises a galvo mirror control unit.

17. The apparatus of claim 8, wherein the test hologram corresponding to the first partitioned region of the holographic recording medium is automatically selected as the test hologram with the maximum diffraction efficiency, and wherein the inclination angle is automatically corrected based on the reference incidence angle.

18. The apparatus of claim 8, wherein the first partitioned region is further associated with a stepped incidence angle of 0°.

19. The apparatus of claim 8, further comprising a spatial light modulator configured to:

set the test hologram corresponding to the first partitioned region to include a pixel set equal to a level representing a light spot, and set the test hologram corresponding to the second region to include a pixel set equal to a level representing a dark spot.

20. The apparatus of claim 8, further comprising a spatial light modulator configured to:

set the test hologram corresponding to the first partitioned region to include a pixel set equal to a level representing a dark spot, and set the test holograms corresponding to the second partitioned to include a pixel set equal to a level representing a light spot.

* * * * *